(12) United States Patent
Singh (10) Patent No.: US 10,564,625 B2
(45) Date of Patent: *Feb. 18, 2020

(54) HIGH SPEED TOOL PATH (71) Applicant: Samarinder Singh, Fontana, CA (US)

(72) Inventor: Samarinder Singh, Fontana, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 15/890,928

(22) Filed: Feb. 7, 2018

(65) Prior Publication Data

US 2018/0164784 A1 Jun. 14, 2018

Related U.S. Application Data (63) Continuation-in-part of application No. 14/628,246, filed on Feb. 21, 2015, now Pat. No. 9,921,567.

(60) Provisional application No. 61/943,090, filed on Feb. 21, 2014.

(51) Int. Cl.
*B23C 1/027* (2006.01)
*G05B 19/4093* (2006.01)
*G05B 19/19* (2006.01)
*G05B 19/4103* (2006.01)

(52) U.S. Cl.
CPC ....... *G05B 19/40937* (2013.01); *G05B 19/19* (2013.01); *G05B 19/4103* (2013.01); *G05B 2219/30* (2013.01); *G05B 2219/34105* (2013.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 7,451,013 B2* | 11/2008 | Coleman | .......... | G05B 19/40937 700/159 |
| 9,921,567 B2* | 3/2018 | Singh | ...................... | G05B 19/19 |
| 2013/0144426 A1* | 6/2013 | Coleman | .......... | G05B 19/40937 700/186 |
| 2014/0297021 A1* | 10/2014 | Aggarwal | ........ | G05B 19/40937 700/160 |
| 2015/0183039 A1* | 7/2015 | Irie | ........................ | B23H 7/065 219/69.12 |

* cited by examiner

*Primary Examiner* — Paul B Yanchus, III
(74) *Attorney, Agent, or Firm* — Select Patents; Ashkon Cyrus (57) ABSTRACT

Improvements in a high speed smooth tool path is presented where the high speed smooth tool path to be used for primarily finishing for finishing any type of walls (negative/positive drafted) for any given bounded region be it 3, 4, 5, . . . n sided shape. The tool path incorporates a combined strategy for finishing the walls while removing any excess material leftover from a previous larger diameter cutter. This tool-motion can be utilized for roughing the regions by approximating the walls by offsetting the regions inwards. The finished boundaries are offset inwards and then cut using these methods. This is optimized as opposed to moving the cutter at a consistent speed in the cutting path. This is performed to eliminate the wasted tool-motion to the maximum extent. This technique is implemented for roughing any closed or open bounded areas regardless of the walls being straight, drafted (negative/positive or both).

20 Claims, 5 Drawing Sheets

HIGH SPEED TOOL PATH

CROSS REFERENCE TO RELATED APPLICATIONS

This application is a continuation in part of application Ser. No. 14/628,246 filed Feb. 21, 2015, which claims the benefit of Provisional Application Ser. No. 61/943,090 filed Feb. 21, 2014, both of which the entire contents are hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in tool cutting path generation. More particularly, the proposed tool path program reduces the machining time while the cutter is finishing the walls by removing the finishing-stock at the higher speeds and maintaining such high cutting velocity/feed-rate in the corners by removing the excess material in 3 or 4 successive cuts depending upon the volume to be removed before continuing to finish along the walls and entering into other corners throughout its trajectory.

2. Description of Related Art Including Information Disclosed Under 37 CFR 1.97 and 1.98

Many parts are machined from a blank of solid material or are finish machined from a casting to achieve the desired end dimensions. For these types of applications the cost to produce the finished part is significantly affected by the amount of time it takes to machine the part. In addition, cutting the part at a rapid speed also affects the quality of the finish on the surface of the part. Multiple fine passes can cause a smooth end result, but at a compromise of the cost to produce the finished part. At the other extreme, quickly cutting the part can result in an unacceptable rough part where the part can have surface imperfections and be prone to early failure.

One of the most critical parts to machine is corners where there is limited clearance for chips to be removed from the corner as the end mill provides a roughing and/or a finishing operation. When the machining is repeatedly performed on multiple parts a time savings of seconds, minutes, hours or more to machine a part has significant impact on the cost of the finished part and the potential profit. Most prior art patents simply generate a cutting tool path to provide a finished part by removing 2-D layers or by making multiple cuts as the tool closes-in to the final dimension. Time spent where the cutter is being re-positioned further reduces efficiency because no material removal is being performed. Keeping the cutter moving at a consistent speed is not optimal and the feed rate should be adjusted based upon the depth of the cut and the amount of material being removed.

For finishing walls of any given multi sided pocket, traditional offset would yield cutter overload in the corners of tool motion. Currently there are a few choices being used in industry to overcome this problem by such as picking corners and then go for finish. This increases amount of time in machining and programming since each tool motion has to be done separately. A number of patents and or publications have been made to address these issues. Exemplary examples of patents and or publication that try to address this/these problem(s) are identified and discussed below.

U.S. Pat. No. 4,970,164 issued Mar. 6, 1990 to Margaret K. Guyder discloses an Automatically Optimized NC Tool Path Generation for Machining. This method is presented to generate 2D tool paths and to optimize the ordering of these tool paths for 2 1/2 axis milling of cavities for molds and dies. The optimization is for the generation of the tool path in a 2-D environment and does not optimize the tool for speed or efficiency nor does it account for sensitive milling of corner.

U.S. Pat. No. 7,451,013 issued Nov. 11, 2008 to Glenn Coleman et al discloses Engagement Milling. The method includes the steps of storing a maximum engagement of the milling cutter and defining each one of the one or more passes such that a value of the engagement, when traversing each one of the one or more passes, does not exceed the maximum value of engagement. While this method provides multiple passes through an area where material is being removed the method does not optimize for the tool passing over the same area multiple times as the tool returns to remove more material on subsequent passes. This method only targets roughing strategy and does not address any finishing strategy. Moreover, it produces higher amount of non-cutting moves.

U.S. Pat. No. 7,930,054 issued Apr. 19, 2011 to Slaughter et al discloses a Method and System for Tool path Generation. The method includes exporting CAD defined 3-D geometry to a slicing module; slicing the 3-D geometry creating a set of 2-D patterns representing the 3-D geometry; generating vector code from the set of 2-D patterns; and translating the vector code to machine code. While the tool path is generated from 3-D geometry to a 2-D pattern there is no efficiency made to reduce the total machining time.

What is needed is a method where the cutter will finish the walls and when approaching the corners then it will maintain the proper load on the cutter by gradually decreasing the distance to be machined the corners. And user can control the distance in corners by a maximum defined volume to be cut. The disclosure found in this document provides a solution to this problem.

BRIEF SUMMARY OF THE INVENTION

It is an object of the high speed smooth tool path to be used for roughing and primarily finishing for finishing any type of walls (negative/positive drafted) for any given bounded region be it 3, 4, 5, . . . n sided shape. The tool path incorporates a combined strategy for finishing the walls while removing any excess material leftover in the corners from a previous larger diameter cutter. This type of tool-motion can be utilized for roughing the regions by approximating the walls by offsetting the regions inwards. The finished boundaries can be offset inwards and then will be cut using these methods.

It is another object of the high speed smooth tool path to account for the tool's deceleration and acceleration as the tool begins to enter and exit from the corner formed by the walls of any given bounded region such as pockets. Such deceleration and acceleration is computed by taking into account old controllers which don't have enough computer processing power to regulate proper kinematics at the higher cutting velocities. So a proper slowdown feed rate can be inserted while cutting thru such corners. It is optional for newer controllers. However, it will yield better results if used on the newer controllers as well especially to produce a better finish in corners.

It is another object of the high speed smooth tool path for the cutter to finish the walls and when approaching the corners the tool path will maintain the proper load on the cutter by gradually decreasing the distance to be machined the corners. A user can control the distance in corners by a maximum defined volume to be cut. The volume of the cut ensures a more consistent surface finish on the part.

It is another object of the high speed smooth tool path to take additional radial passes while maintaining the volume commanded established by a user for material and setup conditions. Maintaining a constant volume of material removal provides the most efficient removal of material and therefore reduces the overall machining time to produce a finished part.

It is still another object of the high speed smooth cutting path to develop a tool path by developing and by keeping all such factors into mind. This is performed to eliminate the wasted tool-motion to the maximum extent. And this combined finishing strategy with light roughing in the corners can be implemented for roughing as well, for any closed or open bounded areas regardless of the walls being straight, drafted (negative/positive both).

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
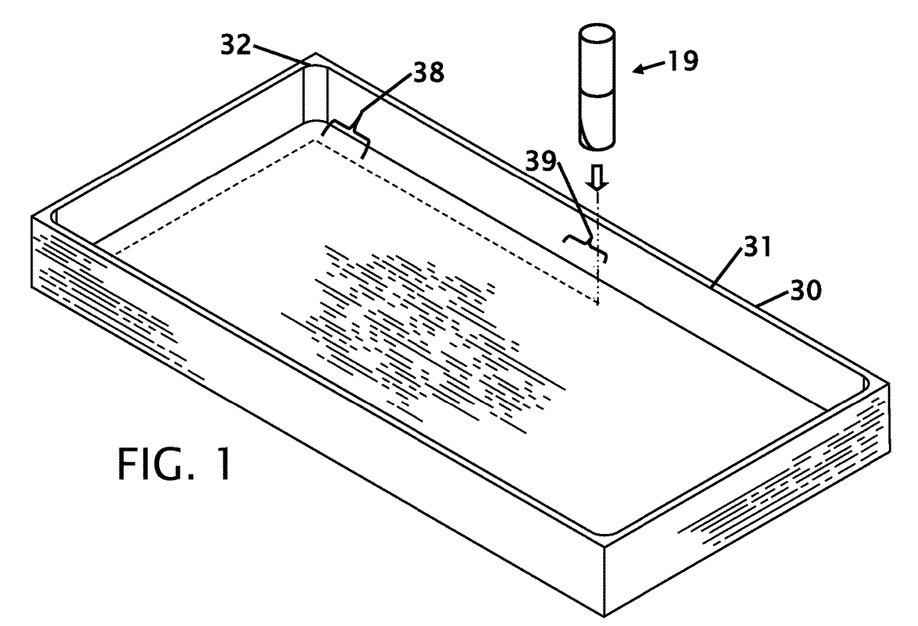
FIG. 1 shows a perspective view of a milled pocket walls from the high speed smooth toolpath.

FIG. 1 shows a perspective view of a milled pocket walls from the high speed smooth toolpath. This figure shows a square end mill in a roughing path. The speed and step of the cutter is maintained on straight sections where large amounts of clearance exist for removal of chips. To optimize machining efficiency the high speed smooth tool path program starts by slowly opening a pocket in a solid blank 30 and steps down along a side 39 of the blank to obtain the desired depth and side dimension for the pocket 31. Upon approaching a corner 32 the high speed smooth tool path optimizes slows 40% to 75%, more preferably 60%. A Slow-down is only needed for older milling machine controls. Moreover, the slow-down is accurately calculated based upon the tool-path trajectory's arc at the center of the cutter and at the tangent. In this case, the right side is the side which is engaged into cut if looking from the top of the cutter. The slow-down will only occur while the cutter is finishing the corner. These ratios are based on the diameter of the cutter, the material and the horsepower of the machine. In addition to optimizing the tool path the speed of the cutter in the starting position 39, along the side(s) and the corner(s) (32) the speed of rotation of the cutting mill and the travel rate of the cutting mill is adjusted. The spindle-speed and feed-rate for the cutting tool is adjusted based upon the calculation of the required tangential cutting forces at the tool's cutting edges. These calculations are required for a better approximation of the required amount to slow the cutting tool as the cutting tool approaches and enter a corner.

Figure 2:
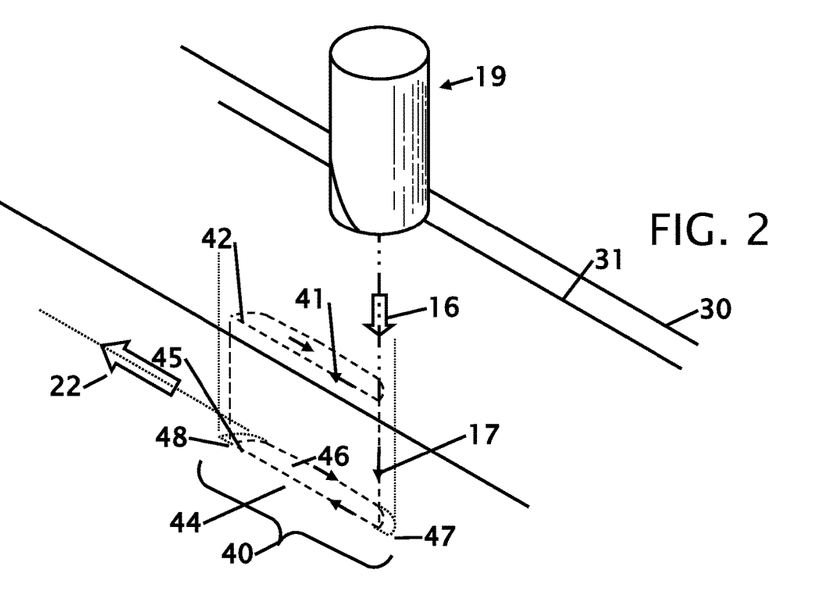
FIG. 2 shows a perspective view of an initial side material removal.

FIG. 2 shows a perspective view of an initial side material removal. This roughing cut leaves a clearance of about 0.100 to 0.025 inches, more preferably 0.050 inches from the finished wall dimension. The finished boundaries can be offset inwards and then cut using these methods. The high speed smooth toolpath overlays over the toolpath from computer aided (CAD) toolpaths that are available from one or multiple providers and/or other CAD programs inside these programs for profile contouring. The tool path is generated by creating center line geometry for the toolpath with this an algorithm in any given CAD system, then with the CAM modules the given cutter is driven on these center lines.

From FIG. 2, the milling cutter 19 is shown entering 16 into the material. As the milling cutter 19 enters to form the pocket walls 31, the cutter starts at a location that is away from the final side dimension by about 0.100 to 0.025 inches, more preferably 0.050 inches. The cutter will follow an offset distance 41 to provide a clearance pocket for chip removal. At a distance 42 along the side of the unfinished side wall the cutter 19 will change direction and approach the finished side wall dimension with an asymptotic approach where the milling cutter will then move away from the finished dimension and lower 17 to roughing bottom depth. The cutter 19 will then extend beyond the previously opened area 44 at an accelerated rate and slow down as the cutter 19 mills into the blank to remove material and move towards the finished dimension 48 and again make an asymptotic approach 46 to the finished dimension. At the finished dimension the cutter can return to a roughing dimension 47 or can finish the side dimension 22 while maintaining the proper load on the cutter by gradually decreasing the distance to be machined the corners on an approach 22 to a corner or corner detail.

Figure 3:
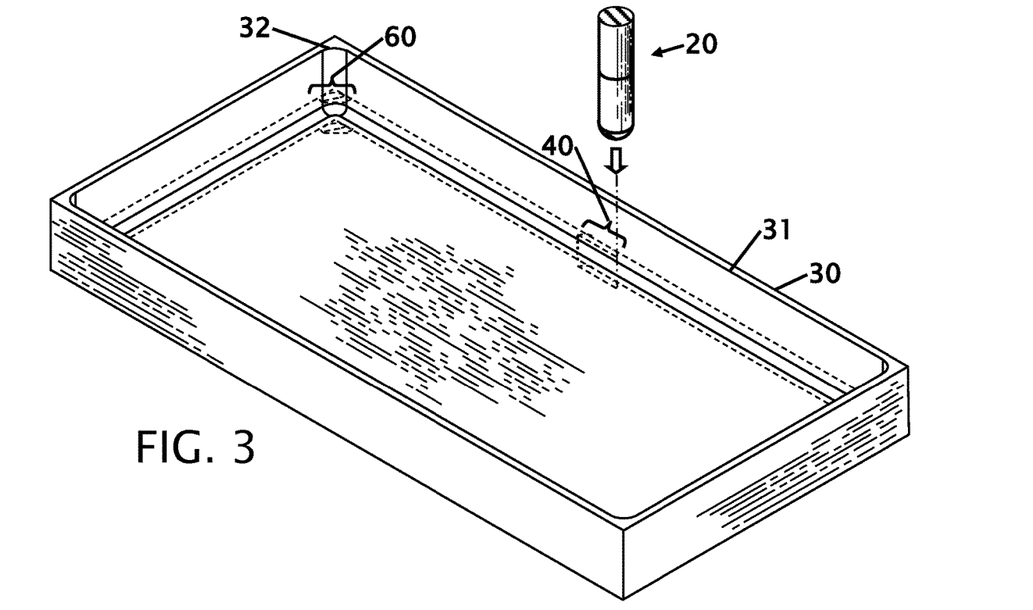
FIG. 3 shows a perspective view of a milled pocket walls from the high speed smooth toolpath.

FIG. 3 shows a perspective view of a milled pocket walls from the high speed smooth toolpath. To optimize production of machining parts the tool path needs to be optimized to ensure that the cutter removes the maximum amount of material in a given amount of time. The amount of material removal can also affect the quality and surface finish. Many machining programs focus on repeating patterns of removing material in ever widening lines, circles or arcs to slowly remove the material in finite steps. The step increment is established based upon critical removal of material from a corner where the cutter pushes into a hole with minimal chip clearance. The speed and step of the cutter is maintained on straight sections where large amounts of clearance exist for removal of chips. In general, the cutter will clear material from 0.020 inches to 0.005 inches, preferably 0.010 inches from a side wall and 0.015 inches to 0.005 inches, preferably 0.008 inches from a finish floor dimension. These dimensions will leave sufficient clearance to allow for a clean final cut to the finished dimension.

Figure 4:
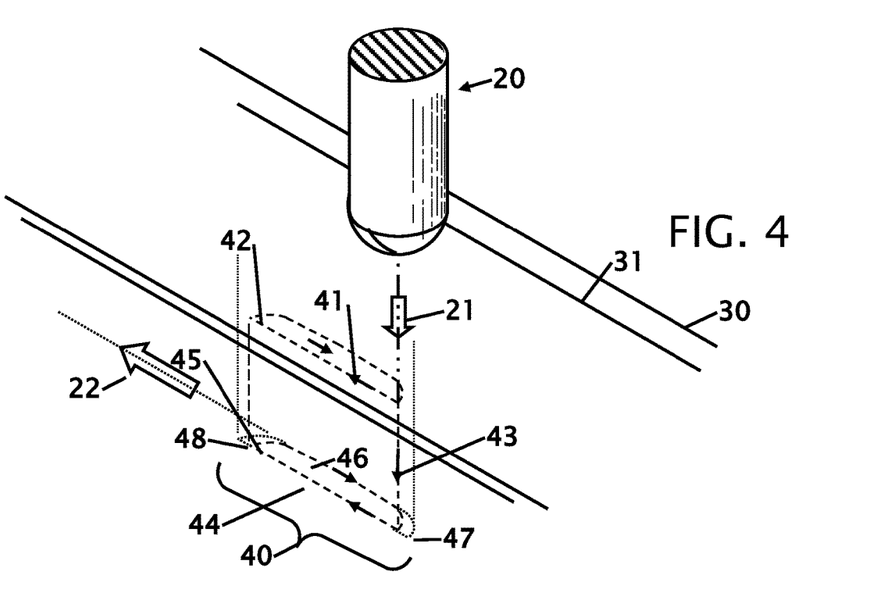
FIG. 4 shows a perspective view of an initial side material removal.

To optimize machining efficiency the high speed smooth tool path program starts by slowly opening a pocket in a solid blank 30 and steps down along a side 40 of the blank to obtain the desired depth and side dimension for the pocket 31. Upon approaching a corner 32 the high speed smooth tool path optimizes passes 60 in the corner to first clear the corner for chip removal, makes a roughing pass and then finishes the corner to the desired dimension. In addition to optimizing the tool path the speed of the cutter in the starting position 40, along the side(s) and the corner(s) (60) the speed of rotation of the cutting mill and the travel rate of the cutting mill is adjusted. FIG. 4 shows a perspective view of an initial side material removal.

This tool path style is not just for roughing. It is primarily intended for finishing any type of walls (negative/positive drafted) for any given bounded region be it 3, 4, 5, . . . n sided shape. My main claim is that it is a combined strategy for finishing the walls while removing any excess material leftover from a previous larger diameter cutter. However, this type of tool-motion can be utilized for roughing the regions by approximating the walls by offsetting the boundary region(s) inward. In other words, the finished boundaries can be offset inwards and then cut using these methods.

From FIG. 4, the milling cutter 20 is shown entering 21 into the blank 30 to form a pocket 31. As the milling cutter 21 enters to form the pocket 31, the cutter starts at a location that is away from the final side dimension. The cutter will follow an offset distance 41 to provide a clearance pocket for chip removal. At a distance 42 along the side of the unfinished side wall the cutter 20 will change direction and approach the finished side wall dimension with an asymptotic approach where the milling cutter will then move away from the finished dimension and lower 43 to roughing bottom depth. The cutter 20 will then extend beyond the previously opened area 44 at an accelerated rate and slow down as the cutter 20 mills into the blank to remove material and move towards the finished dimension 48 and again make an asymptotic approach 46 to the finished dimension. At the finished dimension the cutter can return to a roughing dimension 47 or can finish the side dimension 22 while maintaining the proper load on the cutter by gradually decreasing the distance to be machined the corners on an approach 22 to a corner or corner detail.

Figure 5A:
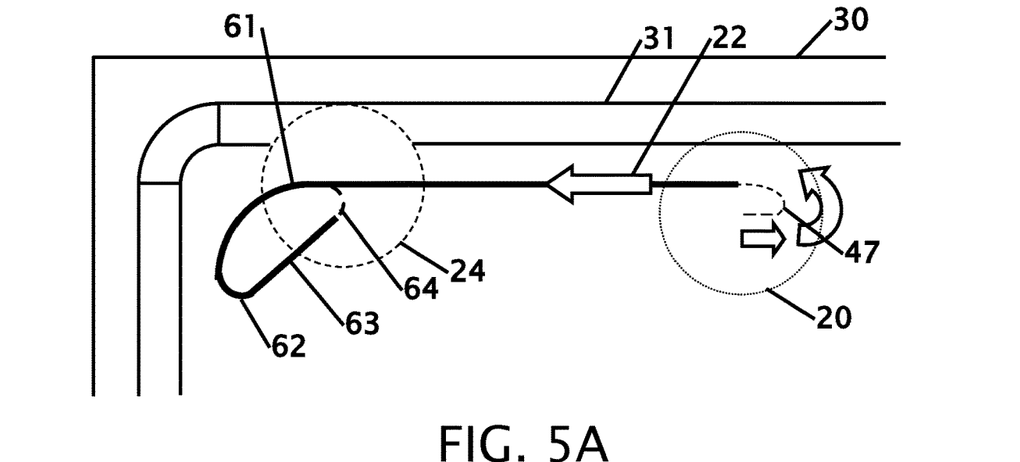
FIG. 5A shows a first pass for corner material removal.
Figure 5B:
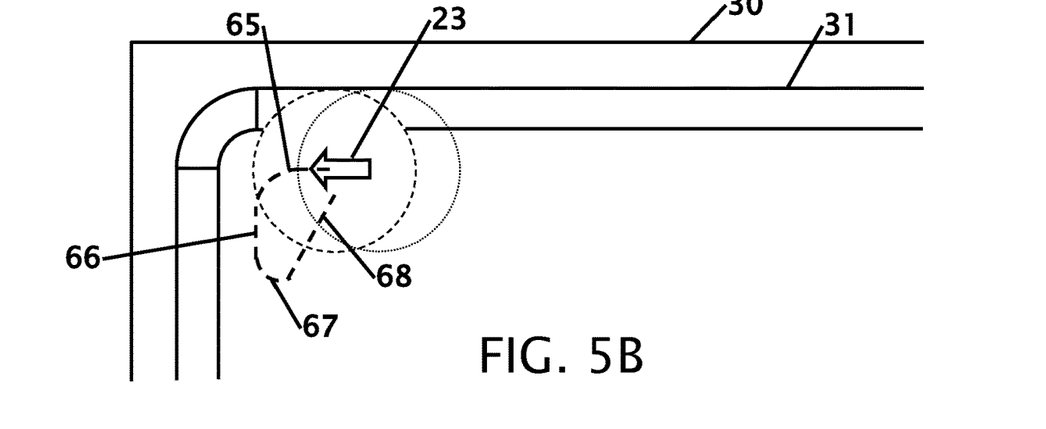
FIG. 5B shows a second pass for corner material removal.
Figure 5C:
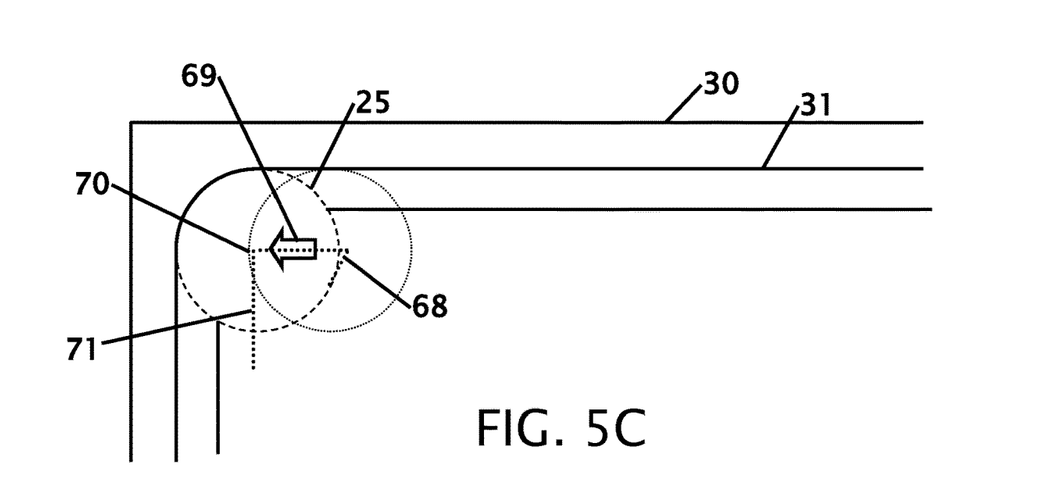
FIG. 5C shows a corner finish.
Figure 6A:
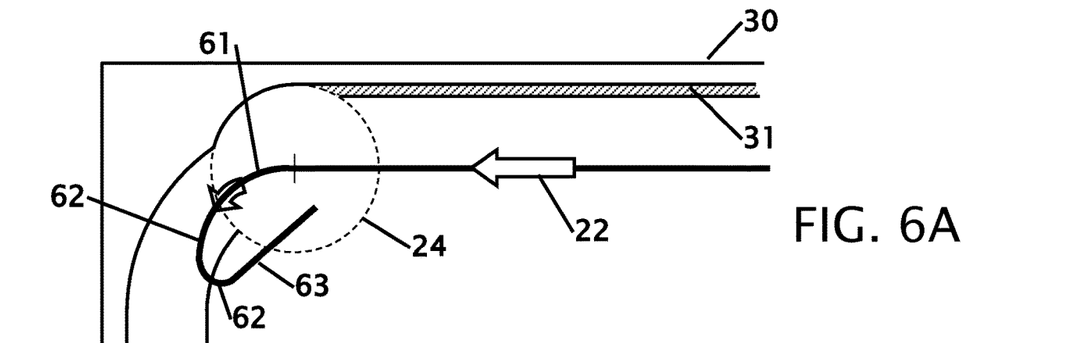
FIG. 6A shows a first pass and return for corner material removal.
Figure 6B:
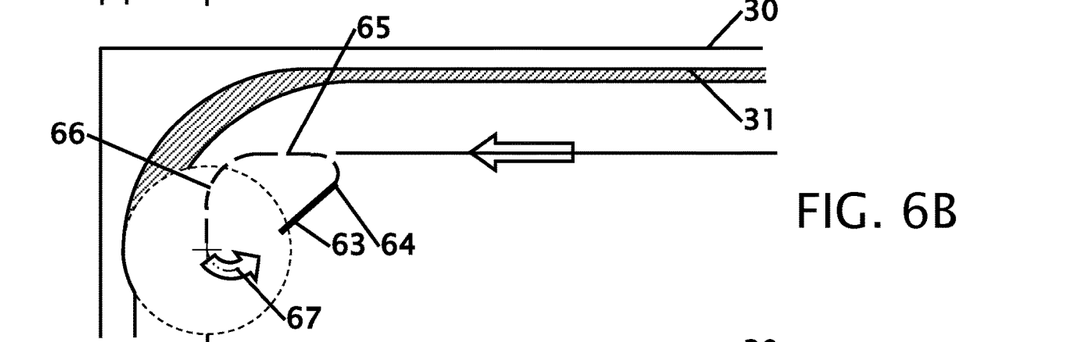
FIG. 6B shows a second pass for corner material removal.
Figure 6C:
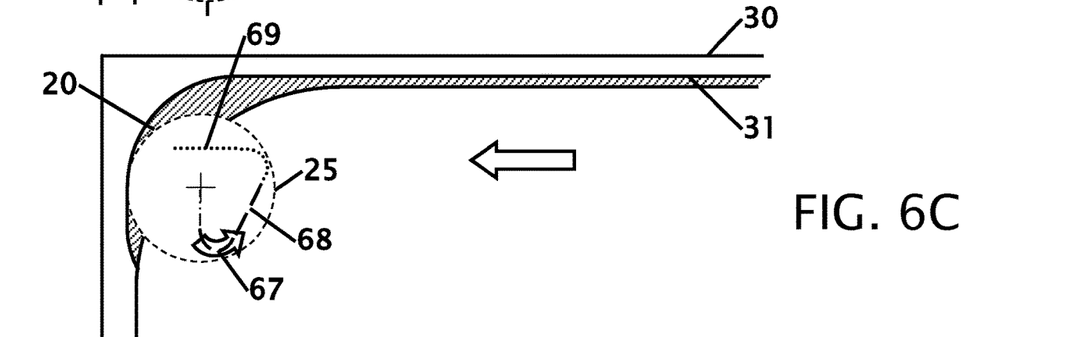
FIG. 6C shows a second pass return and a corner finish pass.
Figure 6D:
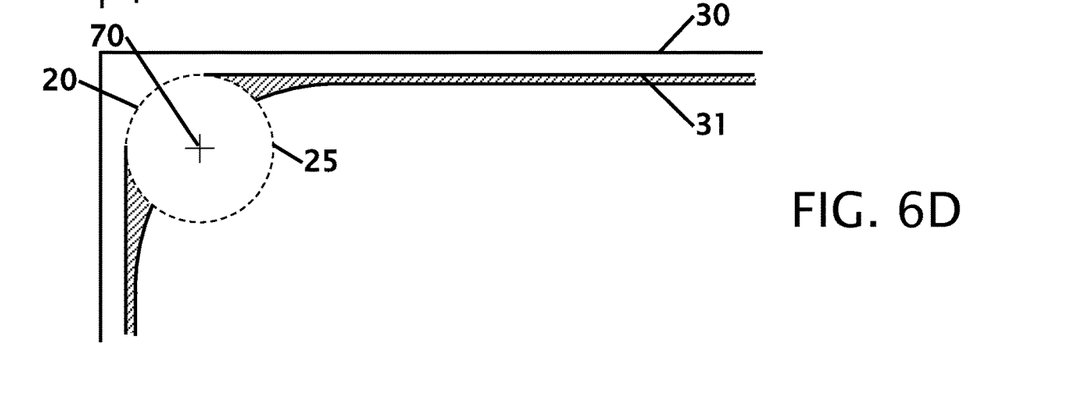
FIG. 6D shows the cutter in the finished corner.
Figure 7:
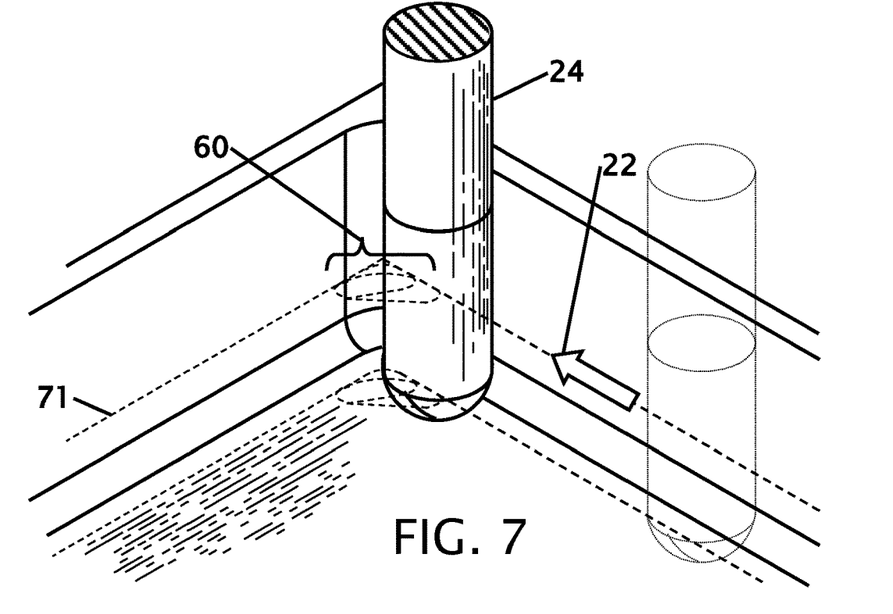
FIG. 7 shows a perspective view of the cutter passes.
Figure 8:
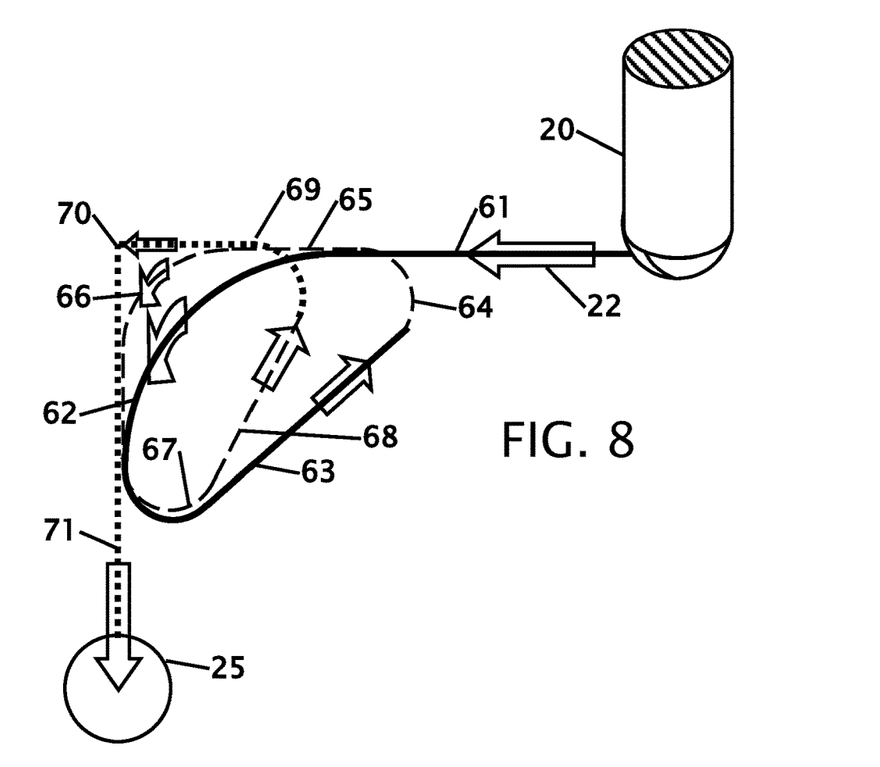
FIG. 8 shows a plan view of the corner material being removed.

FIG. 5A-5C show corner material removal FIG. 6A-6D the material removal in four sections, FIG. 7 shows a perspective view of the cutter passes and FIG. 8 shows a plan view of the corner material being removed. A user can control the distance in corners by a maximum defined volume to be cut. It will then take additional radial passes by maintaining the volume commanded by user for material and setup conditions. Doing so will eliminate the wasted tool-motion to the maximum extent. This technique can be implemented for roughing any closed or open bounded areas regardless of the walls being straight, drafted (negative/positive both).

In these figures the cutter is shown or referred to as item 20, 24 and 25 interchangeable. The views further show the cutter with straight walls but it should be understood that the same material removal tool path can be implemented with drafted walls.

As the cutter 20 approaches 22 the corner for milling 40, the cutter 24. The feed rate remains constant the milling cutter 20 will follow the first tool path 61 to clear a pocket of chips. The radius of the initial arc 62 is approximately the diameter of the mill 20 from the end point of the corner. The cutter will rough the arc 62 as the cutter 20 approaches a roughing dimension of the adjacent side wall.

As the cutter clear a path at the side wall the cutter 20 will accelerate back 63 to the original sidewall to minimize the time the cutter is not removing material. As the cutter 20 approaches the original wall, the cutter 20 will approach 64 the original wall and make a second pass 65 of the side wall and arc 66 to further rough the corner. This pass is essentially within a diameter of the cutter 20. This pass can be made with the original diameter of the cutter 20 or the diameter of the cutter 20 can be changed to a smaller diameter 25 to cut a smaller diameter corner radius.

After the cutter 20 approaches 67 the original turn-around location the cutter 20 will again accelerate across the cleared area 68 to a location approximately between the original turn-around point 64 and the previous corner depth 66 and approach the final side dimension 69. From this location 69 the cutter will mill into the finished corner 70 and the cut the rough or finished adjacent side wall 71. This approach is duplicated for all remaining corner or corner details.

The corners are essentially cleared in loops within a radius or diameter of the corner or the previous corner pass. The speed of the cutter 20 tries to maintain a constant rate of chip removal regardless of the motion of the cutter. It is also contemplated that sensors of the cutter 20 can provide feedback on the load on the cutter 20 and the feed rates can be adjust based upon the load.

In another preferred embodiment the cutter 20 enters at a slight angle to the wall 31 at the entry point 21 and then cuts the walls 31 in 2 axial levels in this 4-sided pocket example. Each corner 60 is finished with 2 additional radial passes before the cutter 20 continues to finish remaining finishing stock on the walls 31. Then after cutting these 2 axial levels a spring pass is made at the 2nd level. This time no additional passes are required in the corners 60. Then cutter 20 returns to the starting entry point 21 and overlaps while exiting the wall 31 at a slight angle away from the wall 31. However, there are times when such pockets/walls can be cut in a lesser number of axial levels depending upon the cutter diameter to walls' depth ratio. This ratio is changed as finishing cutter diameter changes. For example, for 0.75 inches diameter cutter the depth ratio can be up to 2.75 times the diameter of the cutter. In the example where a 2.0 inches tall walls can be finished using 0.75-inches diameter end-mill in a single axial level. The larger depth ration increases the productivity by utilizing the full flute (cutting) length of the cutter.

After roughing of the pocket with a larger cutter, for example a 2.00 inch diameter cutter, which is programmed to leave about 0.050 inches of finishing-stock on the walls and corners. The corners will have more stock since the larger cutter is used for roughing forming larger radii in the corners.

Next a cutter of a diameter of, for example, 0.750 inches enters into the cut with a clearance of 0.007 inches from the walls and 0.010 inches from the finished floor. Because the floor is already finished with a previous toolpath with other milling strategies. The cutter then performs the light roughing in the corners using 2 or 3 extra passes and then continues finishing along the walls.

The cutter then comes back at the starting the point and then loops back and goes for a final finish pass. The final finish pass does not need any extra passes in the corners since it is only removing 0.007 inches of material from the walls and 0.010 inches from the floor. The cutter then returns or overlaps to the starting point and moves away from the wall thus finishing the walls to final dimensions. In an alternative embodiment, a final finish pass along the boundary walls will require at least an additional extra pass in the corner if the corner's leftover material width at floor exceeds 90% of cutter's flat width at the tip of the cutter.

Because of the minimal amount of material that is being removed on the final pass. i. e. 0.007 from the side walls and 0.010 inches from the floor, there is no spring pass needed since this amount of material removal does not produce any cutter deflection in the soft materials. In harder materials, a spring pass and more than one axial level can be added because these harder materials can produce deflection in the cutters.

Essentially this metal removal strategy has two main passes along the walls one being semi-finish pass and other is final finish pass. The semi-finish pass contains extra 2 or 3 or more radial step-overs of material removal depending upon the leftover material in the corners. This semi finish pass can be utilized as a roughing strategy for such n-side regions. However, the initial entry is modified.

The high speed smooth tool path may include a spring pass on more than 1 axial level if the wall depth exceeds a depth ratio equal or greater than two times a diameter of the cutter in hard metals. For all other materials, the spring pass is used on more than 1 axial level if the wall depth exceeds a depth ratio equal or greater than 3.5 times a diameter of the cutter.

Thus, specific embodiments of a high speed smooth tool path have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A method for implementing a high speed tool path comprising:
   generating a tool path whereby a cutter enters at a first angle to a first wall at an entry point on a stock;
   cutting said first wall in a first and at least a second axial level;
   finishing at least one corner in said first axial level and said at least a second axial level with at least two radial passes, wherein finishing will require at least an additional extra pass in the corner if a leftover material width of the corner at floor exceeds 90% of the cutter's flat width at a tip of the cutter;
   allowing said cutter to continue finishing said stock on remaining walls;
   cutting a spring finish pass at said second axial level, wherein the spring finish pass requires at least two radial passes at least in one corner only at a floor level;
   returning said cutter to said entry point, and
   said cutter overlaps said entry point while exiting said first wall at an angle away from said first wall.

2. The method for implementing a high speed tool path according to claim 1 further including a spring finish pass on more than 1 axial level if said first wall depth exceeds a depth ratio equal or greater than two times a diameter of said cutter in hard metals.

3. The method for implementing a high speed tool path according to claim 1 further including a spring finish pass on more than 1 axial level if said first wall depth exceeds a depth ratio equal or greater than 3.5 times a diameter of said cutter in all cases.

4. The method for implementing a high speed tool path according to claim 1 that further includes at least a third axial level.

5. The method for implementing a high speed tool path according to claim 4 wherein said tool path finishes said corners and said walls in a single trajectory of said tool path.

6. The method for implementing a high speed tool path according to claim 1 wherein said first axial level is 0.020 inches to 0.005 inches from a finish side wall dimension.

7. The method for implementing a high speed tool path according to claim 1 wherein said second axial level is 0.020 inches to 0.005 inches from a finish side wall dimension.

8. The method for implementing a high speed tool path according to claim 1 wherein said second level is 0.015 inches to 0.005 inches from a finish floor dimension.

9. The method for implementing a high speed tool path according to claim 1 wherein said cutter slows between 40% and 75% before said at least one corner.

10. The method for implementing a high speed tool path according to claim 9 wherein said cutter slows when said cutter's radius is less than or equal to the radius of a profile cut that is generated by said cutter.

11. A method for implementing a high speed tool path comprising:
    generating a tool path whereby a cutter enters at a first angle to a first wall at an entry point on a stock;
    cutting said first wall in a single rough first level with a clearance from a finished dimension;
    providing a semi-finish pass on at least one corner in said single rough first level;
    allowing said cutter to continue said semi-finish pass on said stock on remaining walls;
    removing material in a second tool path whereby said cutter enters at a second angle to said first wall at said entry point on said stock;
    cutting said first wall in at least a second axial level;
    finishing at least one corner in said at least a second axial level with at least two radial passes only at floor level, wherein finishing will require at least an additional extra pass in the corner if a leftover material width of the corner at floor exceeds 90% of the cutter's flat width at a tip of the cutter;
    allowing said cutter to continue finishing said stock on remaining walls;
    returning said cutter to said entry point, and
    said cutter overlaps said entry point while exiting said wall at an angle away from said first wall.

12. The method for implementing a high speed tool path according to claim 1 further including a spring finish pass on more than 1 axial level if said first wall depth exceeds a depth ratio equal or greater than two times a diameter of said cutter in hard metals.

13. The method for implementing a high speed tool path according to claim 1 further including a spring finish pass on more than 1 axial level if said first wall depth exceeds a depth ratio equal or greater than 3.5 times a diameter of said cutter in all cases.

14. The method for implementing a high speed tool path according to claim 11 wherein said first level is 0.020 inches to 0.005 inches from said finished wall.

15. The method for implementing a high speed tool path according to claim 11 wherein said first level is 0.020 inches to 0.005 inches from said finished floor.

16. The method for implementing a high speed tool path according to claim 11 that further includes at least a third axial level.

17. The method for implementing a high speed tool path according to claim 16 wherein said tool path is for corner milling.

18. The method for implementing a high speed tool path according to claim 11 wherein said second axial level is 0.020 inches to 0.005 inches from a finish side wall dimension.

19. The method for implementing a high speed tool path according to claim 11 wherein said cutter slows between 40% and 75% before said at least one corner.

20. The method for implementing a high speed tool path according to claim 19 wherein said cutter slows when said cutter's radius is less than or equal to the radius of a profile cut that is generated by said cutter.

\* \* \* \* \*